United States Patent [19]

Mielnik

[11] Patent Number: 5,127,872
[45] Date of Patent: Jul. 7, 1992

[54] PROCESS AND DEVICE FOR FILLETING OF MEAT

[76] Inventor: Jan Mielnik, Måltrostveien 1, N-1430 Ås, Norway

[21] Appl. No.: 658,967

[22] Filed: Feb. 20, 1991

Related U.S. Application Data

[63] Continuation of Ser. No. 246,303, Sep. 6, 1988, Pat. No. 5,030,163.

[30] Foreign Application Priority Data

Jan. 7, 1978 [NO] Norway ............................. 870070

[51] Int. Cl.$^5$ .............................................. A22C 21/00
[52] U.S. Cl. ..................... 452/128; 452/136
[58] Field of Search ................. 452/136, 138, 128

[56] References Cited

U.S. PATENT DOCUMENTS

| | | | |
|---|---|---|---|
| 4,216,565 | 8/1980 | Volk et al. | 452/136 |
| 4,327,463 | 5/1982 | Martin | 452/138 |
| 4,377,884 | 3/1983 | Viscolosi | 452/138 |
| 4,380,849 | 4/1983 | Adkison et al. | 452/136 |
| 4,446,600 | 5/1984 | Hooley et al. | 452/138 |

OTHER PUBLICATIONS

"Protecon Automatic Deboning Systems for Poultry (P.A.D.)", of Stork Protecon.
"The new way to cut up and debone turkey . . . ", of Barker/Food Craft.
Abstract of International Appln. No. PCT/AU54/00246, International Publication No. WO85/02320 for Method and Apparatus for Stripping Meat from Bones.

*Primary Examiner*—Willis Little
*Attorney, Agent, or Firm*—Poms, Smith, Lande & Rose

[57] ABSTRACT

A method and apparatus for filleting meat from bone containing meat material wherein at least one of the knuckles of the piece of bone which passes through the meat material is removed before the meat is stripped from the bone. Alternatively, the meat piece is cut approximately in half, resulting in two meat pieces, each including a straight or central bone section surrounded by meat with only one knuckle. Thereafter, the knuckle of the meat piece is placed into a slot of a holer and clamped by means of a piston. The apparatus includes a knife assembly on a frame movably mounted relative to the clamp, with the frame carrying first and second pairs of coating knife members configured and positioned for defining a meat stripping opening. The meat piece is clamped with the straight or central section of bone aligned for placement within the meat stripping opening with the knife members of the knife assembly initially in proximity to the knuckle. Then, the knife members are moved into contact with the meat piece, and the knife assembly frame is moved in the direction of orientation of the straight or central section of bone to thereby strip the meat from the bone. Alternative holder devices are provided.

5 Claims, 3 Drawing Sheets

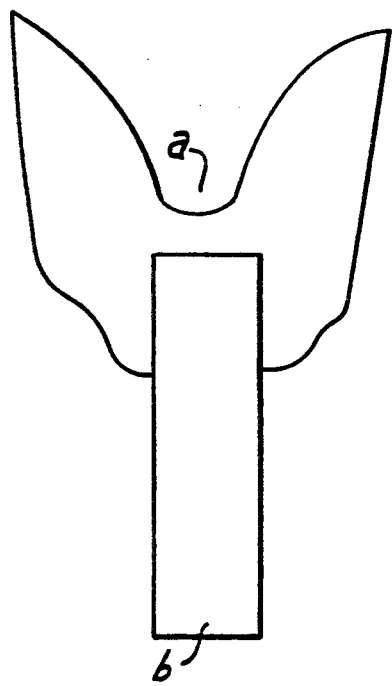 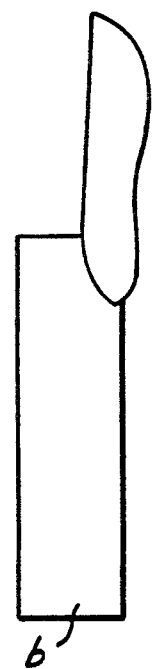
FIG. 5a.  FIG. 5b.
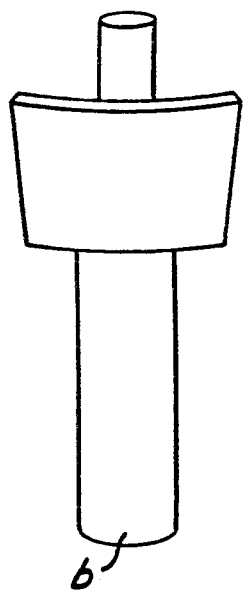 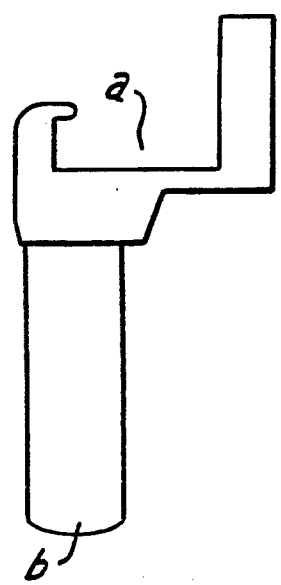
FIG. 4a.  FIG. 4b.

PROCESS AND DEVICE FOR FILLETING OF MEAT

This is a continuation of copending application Ser. No. 07/246,303 filed on Sep. 6, 1988, now U.S. Pat. No. 5,030,163.

BACKGROUND OF THE INVENTION

The present invention concerns a process for filleting meat material containing bones, especially from poultry, livestock, and pigs, as well as a device to carry out the process and where the filleted meat is kept mainly intact.

Previously known are machine-using methods for filleting of meat from bone-containing material. Such devices, however, suffer from several weaknesses both in construction and embodiments.

The general problem with filleting of bone containing meat material where the bone consists of a central bone which runs through the piece of meat, for instance a thigh-bone from chicken, lies in the shape of the bone. Generally, the bone consists of a more or less straight central bone section with an expanded bone part, such as a knuckle on each end. These knuckles form an obstacle by mechanical pressing off of the meat from the bone, both as they are physically working as a stopper for the meat during the pressing off and in addition because knives which are used by the mechanical filleting have a tendency to dull when they cut into the bone material.

It is thus known within the art a machine from Protecon systems (Protecon Automatic Deboning Systems for Poultry, P.A.D.) for automatical filleting of thigh bones and wings from poultry. This system comprises i.a. a transport band with upwards extending pins for introduction of the meat pieces in the filleting machine. However, such an embodiment of the transport band will, when used, cause the meat material to stick between the pins and the transport band and prevent further operations of the machine before it has been cleaned. This will lead to a stop in the operation and wasted working time. A further drawback of such a machine is that possible broken bones in the material are not considered. In industrially handled material, there may be as much as up to 30-40% broken bones and this causes that the finished filleted material from the filleting machine may contain unacceptably large amounts of bone material.

Also the forms of the transport band represents a drawback by the mentioned type of machine. These forms have no possibility for regulation, so that small meat pieces will have a poor fastening and may thus be led the wrong way into the machine, while large meat pieces will lead to the previously mentioned clogging of the form pins on the transport band with the disadvantages this leads to.

Another known type of filleting machine is sold by Barker/FoodCraft and uses rotating knives for the removal of the meat from the bone of meat material. This machine does not consider bones broken before treatment of the piece of meat for filleting either, even if the distributor maintains that breaks caused by the use of the machine are reduced. One disadvantage of this type of machine is that the meat has a tendency to be ground into minced meat by the rotating knives, so that the production of while fillets of meat is difficult to achieve.

A third type of filleting machine is known from European Patent Application No. PCT/AU84/00246 with international publication No. WO 85/02320. This type of filleting device, however, utilizes a different principle from that of the present invention, since this known device uses water with high pressure to remove meat from the bone of the treated meat pieces. Such an embodiment has, however, the disadvantages that the meat easily may become insipid and that the piece of bone must be fastened very firmly since the piece of meat rotates at high speed during the filleting process to remove the loosened meat by help of the centrifugal force, and will thus comprise a cumbersome process for this type of filleting.

SUMMARY OF THE INVENTION

The present invention has the intention to produce a process for filleting meat from bone containing meat material where the whole meat fillets are kept mainly without being destroyed, where the degree of utilization of the meat pieces is large and which is simple to perform. The distinguishing features by such an embodiment is that one of the knuckles of the central piece of bone which passes through the meat material, is removed before the meat is pressed off the bone by help of a knife device which will be described later.

In accordance with the invention, at least one of the knuckles of the pieces of bone which passes through the meat material, is removed before the meat is stripped from the bone. Alternatively, for large pieces, the preprocessed bone and meat is cut approximately in half, resulting in two pre-processed meat pieces, each including a straight or central bone section surrounded by meat with only one knuckle. Thereafter, the knuckle of the meat piece is placed into a slot of a knuckle receiving holder and clamped by means of a piston. The apparatus includes a knife assembly which includes a frame movably mounted relative to the clamps, with the frame carrying first and second pairs of coacting knife members configured and positioned for defining a meat stripping opening. The meat piece is clamped with the straight or central section of bone aligned for placement within the meat stripping opening with the knife members of the knife assembly initially in proximity to the knuckle. Then, the knife members are moved into contact with the meat piece, and the knife assembly frame is moved in the direction of orientation of the straight or central section of bone to thereby strip the meat from the bone. Alternative holder devices are provided.

Other objects, features and advantages of the invention will become readily apparent from a reading of the specification, when taken in conjunction with the drawings, in which like reference numerals refer to like elements in the several views.

BRIEF DESCRIPTION OF THE DRAWINGS

FIGS. 4a and 4b depict front and side elevational views of another embodiment of a holder for use in the apparatus of FIG. 1; and FIGS. 5a and 5b depict front and side elevational views of another embodiment of a holder for use in the apparatus of FIG. 1, the holder being shaped as a knife assembly.

DESCRIPTION OF THE PREFERRED EMBODIMENT

Figure 1:
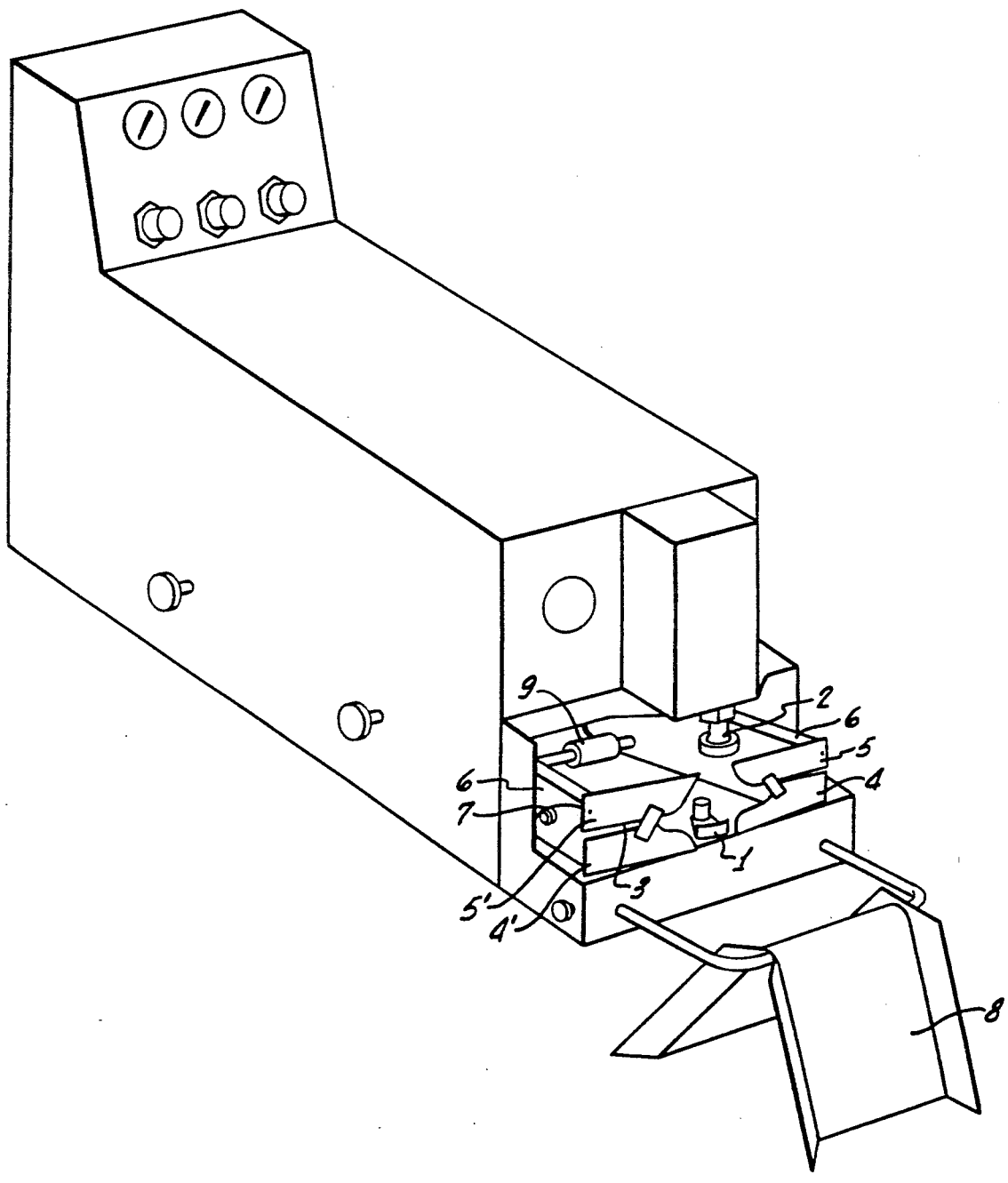
FIG. 1 is a perspective view of the meat filleting apparatus according to the invention.

By using the device according to the invention shown in FIG. 1, it is necessary to use pieces of meat where there is only one knuckle. Such pieces of meat may be produced either by previously removing one of the knuckles of the piece of meat or by dividing a piece of meat with bone into two, so that each part retains one knuckle.

By removal of the meat from the bone in the treated piece of meat, the knuckle is placed in the slot (a) in the holder (1). As shown in FIGS. 4a and 4b, the holder (1) includes a shaft portion "b" which is placed in a bore (not shown) in the table of the apparatus. The recess of slot "a" is defined by first and second upright portions, one of which is higher than the other, for orienting the straight or central section of the bone to the left as viewed in FIG. 4b, which will be to the front of the apparatus as viewed in FIGS. 1 and 2.

The rest of the disclosed treatment steps are automatical and preferably pneumatically or hydraulicly controlled.

To secure the piece of meat, a securing device on the figure shown as a piston (2) which is pneumatically or hydraulicly controlled, thereafter presses the knuckle securely in the groove (a) in the holder (1).

The next step in the filleting process is to press together two knife assemblies which are pneumatically or hydraulicly controlled, and the knife assembly is then pressed forwards in a direction out from the machine. Thereby the meat will be removed from the bone and the mainly intact fillets will fall down on a separating chute (8), while the meat-free knuckle will fall down on the other side of the separating shoot when the piston (2) again moves upwards to release the knuckle and to receive another piece of meat.

The described knife assembly (3) comprises the shown embodiment of four knives places in pairs 4,4', 5,5'), whereof the undermost pair of knives (4,4') is mounted on the pneumatically or hydraulicly controlled arms (6), while the uppermost pair of knifes (5,5') is rotatably mounted relative to the lower pair of knives (4, 4') and loaded by help of springs (7), so that the knives adapt themselves automaticly to the shape and size of the bone type which is to be filleted. In addition, the shape of the knives is such that they between themselves in a pressed together condition form an opening (10) wherein there is room for the bone (shown in FIG. 3).

After the piece of meat has been fastened in the holder (1) by the piston (2), the arms (6) are pressed together for the knives (4,4',5,5') to cut tendons and meat in the area around the secured knuckle. The pressure of the arms (6) may be regulated, for instance by a piston (9) which is mounted between the two arms (6).

After the knives have been pressed together, the arms (6) are moved forwards relatively to the fastening device (2) and the holder (1), so that the meat is pressed from the bone.

In detail, the operation is as follows: After clamping of the knuckle of the piece of meat, the components of the apparatus are in the positions depicted in FIGS. 1 and 2. The clamping area is at the forward end of the enclosure of the apparatus, which includes a vertically (as oriented in the drawings) movable piston (2) which coacts with holder (1) to restrain or clamp the knuckle of the meat piece to be processed. Within this area, there is located a knife assembly (3), which includes first and second pairs of knife members, designated (4, 4') and (5, 5'), which knife members are mounted on a pair of side arms (6), which form a frame movable from the position shown in FIG. 2 to the position shown in FIG. 3. The lower and upper knife members (4, 4'), and (5, 5'), respectively, are blade-shaped members oriented for actuation toward one another in a contacting, slightly overlapping relation. The arms (6), are pneumatically or hydraulically controlled, and, as will be described, move in two directions. In one movement, the arms (6) move toward one another under force of a piston (9), and in another movement, they move together in a generally horizontal direction, which direction coincides with the orientation of the central section of bone of the meat piece to be processed as will be described.

Figure 2:
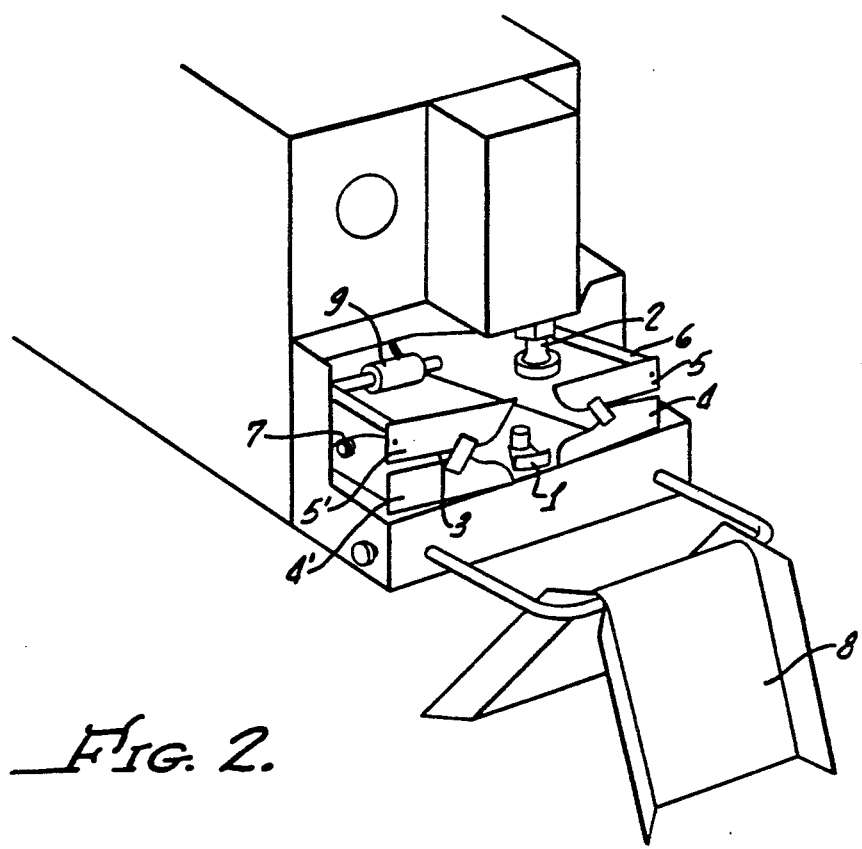
FIG. 2 is a partial perspective view of the knife assembly in the device from FIG. 1 with the frame retracted and the knife members withdrawn.

In the initial position, with the meat piece clamped at the knuckle of the bone, the arms (6) of the frame are retracted to the position shown in FIGS. 1 and 2. The four knives of the knife assembly (3) are initially out of engagement with the meat piece. Each of the lowermost pair of knives (4, 4') is fixedly secured to a free end of one of the arms (6), while each of the uppermost pair of knives (5, 5') is pivotal relative to the lower knives (4, 4') and rotatably loaded by help of springs (7), so that the knives adapt themselves automatically to the shape and size of the bone type which is to be filleted. In addition, the shape of the knives is such that they, between themselves, in the operative pressed together condition (See FIG. 3) form an opening (10) which approximates the cross-section of the central section of bone. With the spring loaded upper knives (5, 5'), irregularities in contour of the bone are accommodated during scraping or removal of the meat therefrom.

After the piece of meat has been fastened in the holder (1) by piston (2), the next step in the filleting process is to actuate movement of the two arms (6) toward one another via the piston (9), during which movement, the spaced coacting pairs of knives (4, 4') and (5, 5') traverse a first line toward the meat piece to cut the tendons, ligaments and meat in the area adjacent the secured knuckle, and stop at the central bone section. The pressure of the arms (6) may be regulated by regulation of the force of piston (9) which is mounted between the two arms (6).

Figure 3:
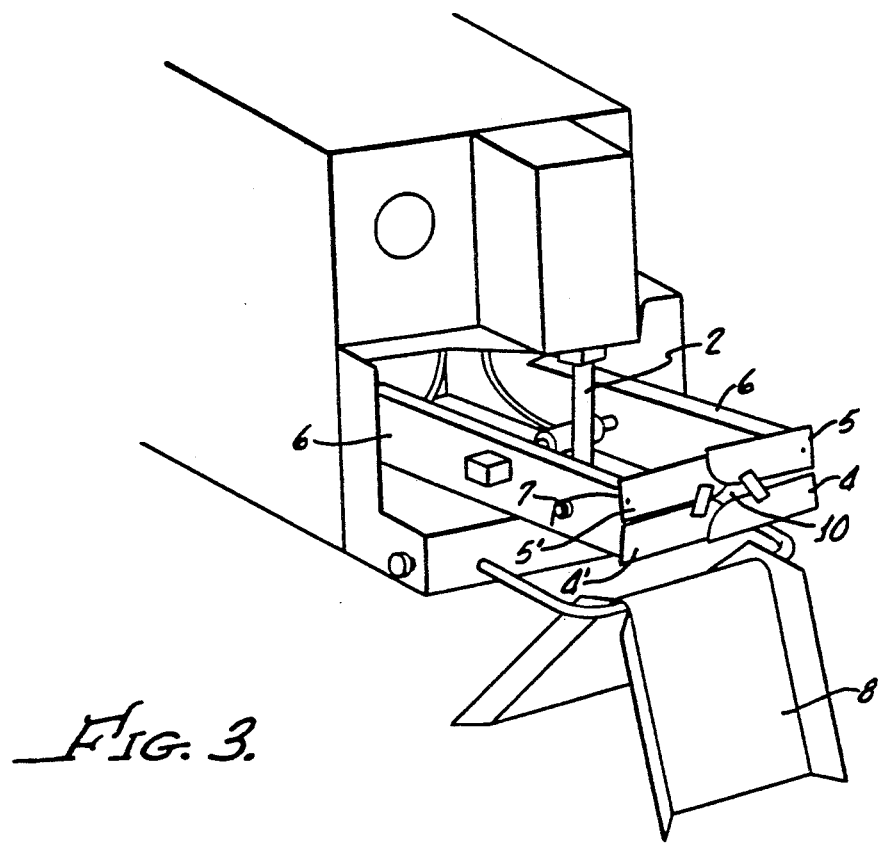
FIG. 3 is a partial perspective view similar to FIG. 2 with the frame of the knife assembly extended to an extreme position and the knife members moved into a position for stripping the meat from the bone.

Thereafter, under pneumatic or hydraulic control, the two arms (6) along with the two pairs of knife members (4, 4') and (5, 5') are extended, or moved, as a unit, forwards relative to the holder (1), along a second line in a direction out from the machine to the position shown in FIG. 3. During this forward movement, the arcuate configuration of the forward engaging edges of the knives (4, 4', 5, 5') are in scraping contact with the bone. Thereby the meat will be removed from the central bone section and the mainly intact fillets will fall down on a separating chute (8), while the meat-free knuckle will fall down on the other side of the separating chute (8) when the piston (2) again moves upwards to release the knuckle and to receive another piece of meat.

In an alternate embodiment the holder (1) may in itself comprise an approximately V-format knife. By placing the knuckle in such a holder a large part of tendons and ligaments near the knuckle will be cut when the piston (2) presses the knuckle to secure it in the V-formed knife (see FIG. 5). With the holder of FIGS. 5a and 5b providing knife edges in the vertical direction, and the coacting knife members providing cutting edges in a more generally horizontal direction, the combined cutting effect is to sever virtually all tendons and ligaments at the knuckle prior to stripping the meat from the bone.

The holder (1) may in addition comprise grooves (b) for the correct positioning in the device according to the invention.

The device and process according to the invention may also be used for meat which has been pre-treated to loosen the bone from the meat, for instance by ultrasound treatment or by treatment with ligament attacking enzymes etc.

By using the process and device which has been described according to the present invention, the loss of meat material by filleting will be reduced considerably, compared to previous techniques, and at the same time meat splints will to a larger extent than previously be avoided in the filleted meat material. The present invention at the same time makes it possible to achieve better meat qualities, because the meat fillets after treatment in a device according to the invention will be present mainly as undamaged meat. In addition, it will be of advantage that meat pieces with breaking damages in the central bone to a larger extent that previously may be used, whereby such pieces of meat according to the present invention may be cut into two pieces in the fracture before the filleting process begins. Thus, fractured bones will be of no consequence, and at the same time the extent of use of the pieces of meat will be significantly improved.

I claim:

1. A process for filleting bone containing meat material, especially from poultry, livestock and pigs, wherein the bone includes first and second knuckle portions with an interconnecting central bone section, said process comprising:
   removing one of said first and second knuckle portions;
   fastening the other of said knuckle portions;
   actuating a plurality of operatively interacting non-rotating knife members toward and into contact with the junction of the central bone section and said other knuckle portion; and
   stripping the meat from said central bone section by linear displacement of said knife members relative to said other knuckle portion while maintaining said knife members in contact with said central bone section, whereby fillets are achieved where the meat is present mainly as undamaged meat, said step of fastening including severing at least a part of the tendons on said other knuckle portion during fastening.

2. The process according to claim 1 wherein the step of removing one of said knuckle portions includes cutting so close to the central bone section that the main part of tendons and cartilage is removed.

3. A process for filleting bone containing meat material, especially from poultry, livestock and pigs, wherein the bone includes first and second knuckle portions with an interconnecting central bone section, said process comprising:
   removing one of said first and second knuckle portions;
   fastening the other of said knuckle portions;
   actuating a plurality of operatively interacting non-rotating knife members toward and into contact with the junction of the central bone section and said other knuckle portion; and
   stripping the meat from said central bone section by linear displacement of said knife members relative to said other knuckle portion while maintaining said knife members in contact with said central bone section, whereby fillets are achieved where the meat is present mainly as undamaged meat, said step of removing one of said knuckle portions including initially cutting the piece of meat in two, so that the central bone section is cut into pieces where each piece has its knuckle portion intact.

4. A process for filleting bone containing meat material, especially from poultry, livestock and pigs, wherein the bone includes a pair of knuckles and a central bone section, said process comprising the steps of:
   removing one of said knuckles to provide a knuckle-free bone end,
   clamping the other of said knuckles in a holder,
   moving first and second knife assemblies from opposite sides of said bone toward one another and toward said bone to initially cut meat material of said bone at said other knuckle, and
   relatively moving said bone and knife assemblies along said bone toward said knuckle-free bone end to remove said meat material from said bone as fillets of mainly undamaged meat, said step of moving first and second knife assemblies toward one another including the step of causing said knife assemblies to cut tendons and cartilage, and wherein said step of relatively moving said bone and knife assemblies includes removing said cut tendons and cartilage.

5. A process for filleting bone containing meat material, especially from poultry, livestock and pigs, wherein the bone includes a pair of knuckles and a central bone section, said process comprising the steps of:
   removing one of said knuckles to provide a knuckle-free bone end,
   clamping the other of said knuckles in a holder,
   moving first and second knife assemblies from opposite sides of said bone toward one another and toward said bone to initially cut meat material of said bone at said other knuckle, and
   relatively moving said bone and knife assemblies along said bone toward said knuckle-free bone end to remove said meat material from said bone as fillets of mainly undamaged meat, said step of clamping comprising providing a holder having a knife, and including the step of pressing said other knuckle against said knife to cut at least tendons of said other knuckle.

* * * * *